United States Patent [19]

Kimbara et al.

[11] Patent Number: 5,076,330
[45] Date of Patent: Dec. 31, 1991

[54] THREE-DIMENSIONAL MULTI-AXIS FABRIC COMPOSITE MATERIALS AND METHODS AND APPARATUSES FOR MAKING THE SAME

[75] Inventors: Masahiko Kimbara; Kenji Fukuta; Makoto Tsuzuki; Hironobu Takahama; Ietsugu Santo; Michiya Hayashida; Akinobu Mori; Akihiko Machii, all of Tsukuba, Japan

[73] Assignee: Three-D Composites Research Corporation, Tsukuba, Japan

[21] Appl. No.: 331,285

[22] Filed: Mar. 31, 1989

[30] Foreign Application Priority Data

Sep. 29, 1988 [JP] Japan .................................. 63-245759
Oct. 3, 1988 [JP] Japan .................................. 63-249517
Oct. 14, 1988 [JP] Japan .................................. 63-258549

[51] Int. Cl.$^5$ ..................... D03D 41/00; D03D 1/00; D03D 11/02
[52] U.S. Cl. .................................. 139/11; 139/384 R; 156/148; 156/393; 428/109; 428/113; 428/119; 428/408; 428/902
[58] Field of Search ............. 139/11, 384 R; 156/393; 428/109, 113, 119, 902, 408

[56] References Cited

U.S. PATENT DOCUMENTS 3,955,602 5/1976 King ..................................... 139/11
4,168,337 9/1979 Maistre ................................ 428/113
4,400,421 8/1983 Stover .................................. 428/113
4,615,256 10/1986 Fukuta et al. ......................... 139/11

FOREIGN PATENT DOCUMENTS 48804 4/1988 Japan ..................................... 139/11
48911 11/1989 Japan ..................................... 139/11

Primary Examiner—James C. Cannon
Attorney, Agent, or Firm—Oblon, Spivak, McClelland, Maier & Neustadt

[57] ABSTRACT

A number of rods are disposed along at least three differently oriented axes, the rods being formed by bonding together bundles of fibers with a matrix. Each rod in one group is passed between rods of the other differently oriented groups. The cross-sectional shape of a rod extending in at least one direction is matched to the shape of a clearance which is left between rods extending in other directions to admit the rod inserted therethrough. Put otherwise, a rod extending in at least one direction has a projection to fill such a clearance. Great enough strength to withstand external forces exerted from any direction is imparted to the three-dimensional fabric composite materials either by increasing the area of contact between individual rods or by minimizing the clearances between rods by means of a matrix of the like. A three-dimensional multi-axis fabric composite material is made by forming rods by bonding together bundles of fibers with a matrix, disposing a number of rods parallel to each other, orienting groups of rods along at least three axes, passing each rod in one group between rods of the other differently oriented groups, and bonding together adjoining rods with the matrix, etc. An apparatus for making three-dimensional multi-axis fabric composite materials includes apparatus for holding a group of warp rods parallel to each other and apparatus for inserting rods including a rod pushing mechanism to hold and push a large number of weft rods placed side by side in the direction intersecting with the warp rods into between the warp rods, etc.

14 Claims, 11 Drawing Sheets

THREE-DIMENSIONAL MULTI-AXIS FABRIC COMPOSITE MATERIALS AND METHODS AND APPARATUSES FOR MAKING THE SAME

FIELD OF THE INVENTION

Greater importance has come to be attached to the technology of making the preform for composite materials that imparts such isotropy and anisotropy as will meet the quality requirements for final products by optimizing the orientation and laminating pattern of reinforcing materials in them.

This invention relates to three-dimensional multi-axis composite materials to which high strength is imparted by optimizing the orientation of fibers and methods and apparatuses for making such fabrics.

DESCRIPTION OF THE PRIOR ART

Various types of automatic weaving machines to automatically make three-dimensional tri-axial fabrics have been developed and proposed, such as the one disclosed in U.S. Pat. No. 3,955,602. With the three-dimensional fabrics made by those conventional weaving machines, however, fibers and fabrics cannot be set in any other orientation than the specified ones. It is impracticable or very difficult to change their basic structures according to their intended uses or other requirements. Their basic structures are limited to those peculiar to individual weaving machines. Besides, no weaving machines to make three-dimensional fabrics in which fibers are isotropically oriented along four or more equally disposed axes have yet been developed.

With conventional three-dimensional fabrics, it has been necessary to provide selvages during weaving to maintain woven forms. Accordingly, mechanism to provide such selvages has been indispensable to conventional three-dimensional weaving machines. Provision of such additional mechanism has complicated the overall structure of such weaving machines.

To overcome the above problem, the inventors continued extensive studies to find an easy way to make multi-axis fabrics for composite materials without requiring the selvages indispensable to the conventional techniques. The inventors took note of a technology to make a rod from a bundle of equally oriented fibers by joining them together with a matrix of resin, metal or other appropriate substances. Attempt was made at forming a composite material based on a three-dimensional multi-axis fabric comprising groups of fabrics extending along at least three differently oriented axes. A rod in each group was inserted through rods in the other differently oriented groups of rods. Studies made on mechanical and other properties of resultant products led to the following finding: Increasing the fiber volume of fraction or the contact between individual rods contributes the properties of three-dimensional multi-axis fabric composite materials. When rods having a circular or other similarly simple cross section extending in three different directions are woven together, unfilled clearances are unavoidably left between the individual rods. Reducing such clearances to a minumum is particularly effective in enhancing the resistance of the composite materials to external forces from various directions.

As shown in FIG. 1, relatively large clearances s are left between rods x, y and z when a three-dimensional multi-axis fabric composite material is made by passing a group of rods through other differently oriented groups of rods. When the direction of external force acting on the fabric composite material coincides with that of any one group of rods, the clearances s rarely present a problem because of the effect of the strength of the rods extending in that direction. However, when the external force is aslant to all groups of rods, the presence of the clearances s facilitates the relative angular displacement of differently oriented rods even if adjoining rods are connected to each other by means of a matrix. Then, the entire fabric composite material may deform even when a relatively small external force works thereon. This problem can be overcome to a certain extent by filling a matrix between the fibers, including the clearances s, of the three-dimensional fabric composite material on completion of weaving. When the packing density of fibers is high, however, it has not been easy to thoroughly fill a matrix between fibers or groups of fibers.

The fibers or bundles of fibers in conventional three-dimensional fabrics have been bonded together by a matrix that is impregnated and that hardens subsequently. However, it has been difficult to uniformly harden the entire matrix. When a fabric composite material is heated or cooled to harden its matrix, for example, it has been difficult to equalize the temperature in the peripheral and central areas of the material. When the hardening process is accompanied by heat generation, the generated heat is more difficult to dissipate in the central area than elsewhere, with resultant temperature inequalities throughout the material. Resulting shrinkage or thermal strain can even produce many cracks in the matrix.

OBJECTS OF THE INVENTION

An object of this invention is to provide three-dimensional multi-axis fabric composite materials having three or more axes that are made of rods prepared by bonding together bundles of fibers with a matrix. The fabric composite materials according to this invention are imparted with high enough strength to withstand external forces from any direction by minimizing the relative displacement of the constituent rods.

Another object of this invention is to provide methods and apparatuses for making three-dimensional multi-axis fabric composite materials that permit free setting of fiber orientation and that facilitate the making of three-dimensional multi-axis fabric composite materials having three or more axes. The methods according to this invention are freed from the trouble of making selvages at the ends of fibers or threads, while the apparatuses according to this invention is simple because no selvage-making mechanism is needed.

Still another object of this invention is to provide three-dimensional multi-axis fabric composite materials whose strength is kept unimpaired by preventing the occurrence of cracks and other undesirable defects.

SUMMARY OF THE INVENTION

To achieve the above objects, a three-dimensional multi-axis fabric composite material of this invention comprises a number of rods that are disposed parallel to each other, the rods being formed by bonding together bundles of equally oriented fibers with a matrix. Resultant groups of rods are oriented along at least three axes. Each rod in one group is passed between rods of the other differently oriented groups, with the adjoining rods being bonded together. In this material, the cross-sectional shape of a rod extending in at least one direction is matched to the shape of a clearance through which the rod is to be passed which is left between rods extending in other directions. Or put otherwise, a rod extending in at least one direction has a projection to fill such a clearance. Rods of the above two types may be used either singly or in combination.

Rods extending in one direction may be held in close contact with each other, with grooves to permit the passing of other rods extending in other directions provided between each two adjoining rods.

Rods of the above types facilitate the passing of rods disposed parallel to each other through rods extending in other directions. This makes it easy to make three-dimensional fabric composite materials of various structures without forming selvages or filling a matrix of resin or other substances between the fibers or bundles of fibers in the formed three-dimensional fabrics.

When a three-dimensional multi-axis fabric composite material is made of groups of rods disposed along multiple axes, the clearance s is left between individual rods as shown in FIG. 1. When an oblique external force works on this fabric composite material, differently oriented rods held in contact with each other readily tend to cause relative angular displacement because of the clearance. Therefore, such fabric composite material deforms even when the external force acting thereupon is relatively small. But great enough strength to withstand external forces exerted from any direction can be imparted to the three-dimensional fabric composite materials either by increasing the area of contact between individual rods or by minimizing the clearances between rods by means of a matrix or the like.

A method of making three-dimensional multi-axis fabric composite materials according to this invention comprises the steps of bonding together equally oriented bundles of fibers into a rod with a matrix, disposing a large number of such rods parallel to each other to form groups of rods extending along at least three different axes, passing each rod of one group between rods of the other groups, and bonding together the interwoven rods with the same matrix or the like. A large number of rods disposed parallel to each other constitute a group of warp rods. Also, two or more groups of weft rods can be formed by disposing a large number of rods parallel to each other and along multiple axes. Then, one after another, weft rods of different groups can be passed from different axial directions between the warp rods.

While weaving together the rods, a matrix can be filled in clearances that are formed, one after another, by and between the interwoven rods. The filled-in matrix can be hardened by the heat given by the reed while weaving is being carried out.

An apparatus for making three-dimensional multi-axis fabric composite materials according to this invention comprises means for holding a group of warp rods, each rod being made up of bundles of equally oriented fibers bonded together with a matrix, parallel to each other; means for inserting rods comprising a rod pushing mechanism to push in a large number of weft rods placed side by side between the group of warp rods from at least two intersecting directions; and means for moving up and down the holding and rod-inserting means as weaving proceeds.

Means to harden and form the rods inserted into the warp rods by said rod-inserting means, such as rod-heating means on the weaving reed, may be provided, too.

The method and apparatus just described permit weaving materials of various structures with three or more different rod orientations by changing the inserting directions of rods.

When a matrix is filled and hardened on completion of weaving, resultant thermal strain often develops cracks in the matrix. But no such cracks occur when the matrix is heated and formed by the heating means on the reed or the like as the weaving of rods proceeds, assuring the making of a strong and homogeneous composite material.

DESCRIPTION OF THE PREFERRED EMBODIMENTS

Rods formed by bonding together many equally oriented fibers with a matrix are used in making three-dimensional multi-axis fabric composite materials according to this invention.

The rods are made of such high-strength fibers as carbon, aramid, and glass fibers or bundles of these fibers. Thermosetting resins, such as epoxy and phenol resins; thermoplastic resins, such as polyamide and acryl resins, nylon, and PEEK; various kinds of inorganic materials, such as metals, ceramics, and glass, and such precursors of inorganic matrix as pitch are used as the matrix for making the rods rigid. The rods and matrix of these resins etc. can be hardened to rods by heating or other treatment prior to weaving. If they have high enough rigidity to endure weaving, they may be used in a semi-cured or uncured state. If their rigidity is not high enough, they may be cooled or otherwise treated to temporarily secure the required rigidity while weaving is carried out. When a three-dimensional multi-axis fabric composite material is made of a c/c (carbon-carbon) composite, the rods hardened with a matrix can be fired on completion of weaving.

Figure 1:
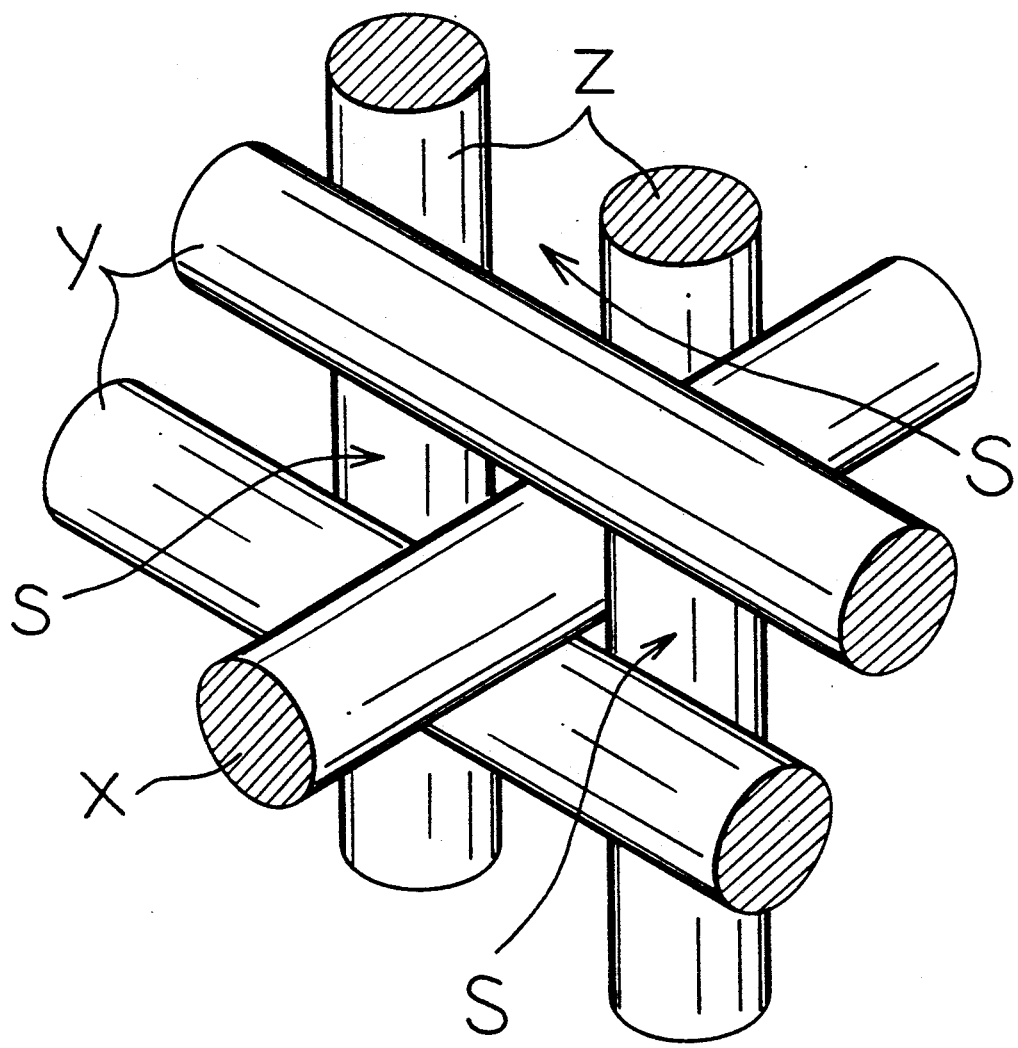
FIG. 1 is a perspective view illustrating the clearances s left between rods of a three-dimensional fabric made by a prior art.
Figure 2:
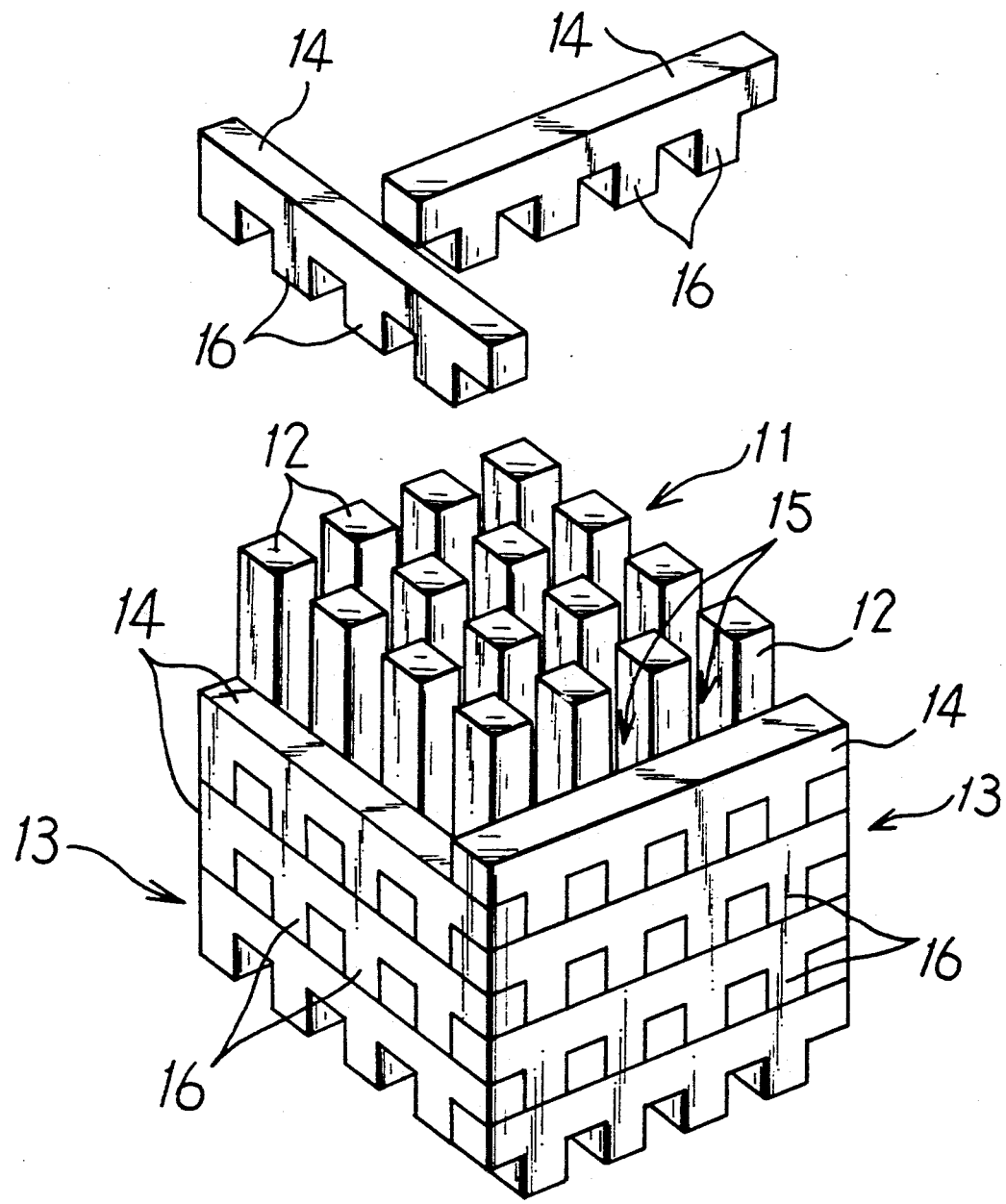
FIG. 2 is a partially exposed perspective view showing a first preferred embodiment of the three-dimensional multi-axis fabric composite material according to this invention.

FIG. 2 shows an example of a three-dimensional multi-axis fabric composite material made of rods of the above-described type. A large number of rods are disposed along three axes intersecting at right angles to each other. Parallel weft rods 14 in two groups 13 of weft rods extending along two perpendicularly intersecting axes are inserted between parallel warp rods 12 of a group 11.

Basically, the rods 12, 14 have a square cross-section matched to the shape of a clearance that is left between rods extending in the other directions to admit each of the rods 12, 14 inserted therethrough. For example, the warp rod 12 in the group 11 has a square cross section matched to a square clearance formed between the weft rods of the groups 13, 13, and the same applies to the weft rods of the groups 13 too. In a three-dimensional quadri-axis fabric composite material made up of a single group of warp rods and three groups of weft rods extending along three different axes in a plane intersecting at right angles thereto, the warp rods, basically, have a triangular or hexagonal cross section and the weft rods a square or rectangular cross section.

The weft rods of the groups 13 have many projections 16, each of which is adapted to fill an inner space 15 formed by the square rods 12, 14, extending in the three different directions. The projection 16 may be made integral to a weft rod 14 by use of a matrix or formed by cutting off the excess portion from a rod originally made to a larger size. Alternatively a separately prepared piece may be bonded or otherwise attached to a weft rod 14. In such instances, the separate piece may be made of the same material as the rod or of different materials, such as ceramics. Various kinds of reinforcing means to prevent deformation and rupture, such as a ceramic ball or a glass balloon, may be put in a block of the same material as the matrix filled between weft rods 14, as well.

The projections 16 should not necessarily be of such size as to completely fill the inner spaces 15 left between the rods. A portion of the inner space 15 may be left unfilled so long as the unfilled space does not exert a significant influence on the strength of the fabric composite material to be made. The unfilled space may be filled afterward, if necessary.

Figure 3:
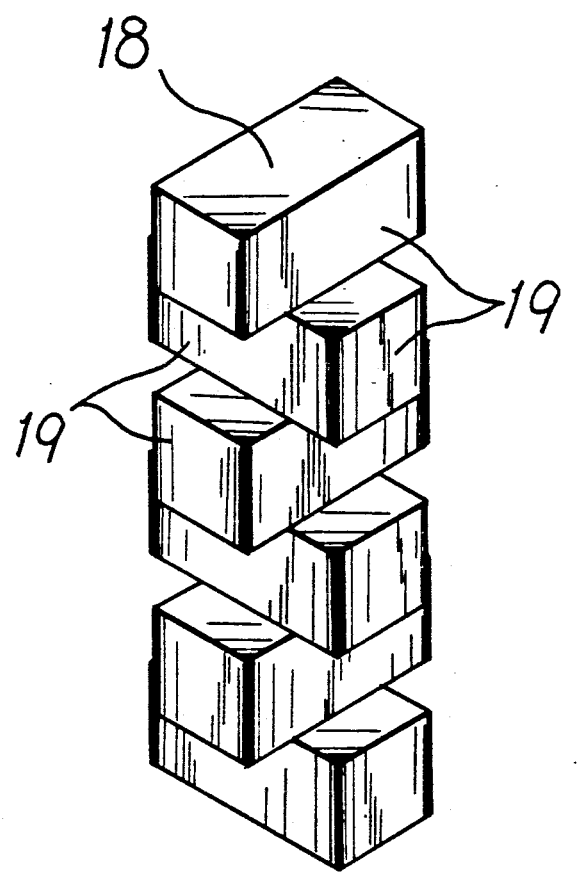
FIG. 3 is a perspective view showing a modification of a warp rod in the same embodiment.

In FIG. 2, the projections 16 are provided on the weft rods 14 of the groups 13 extending along two different axes. However, the projections 16 may instead be provided on rods of at least one group extending in one direction. FIG. 3 shows a preferred embodiment made up of rods 18 extending along three axes intersecting at right angles to each other, in which projections 19 are provided only on the warp rods. Each of the weft rods in another two groups has a square cross section.

Matching the cross-sectional shape of a rod extending in at least one direction to the shape of a clearance left by the rods extending in the other directions permits materially increasing the area of contact between the adjoining rods, with a resulting increase in the strength of the three-dimensional fabric composite material produced. When the inner spaces formed between adjoining rods is filled with projections 16, 19 provided on rods 12, 14 or 18 oriented along at least one axis, the three-dimensional fabric composite material will acquire large resistance to withstand an external force exerted from any direction.

Figure 4:
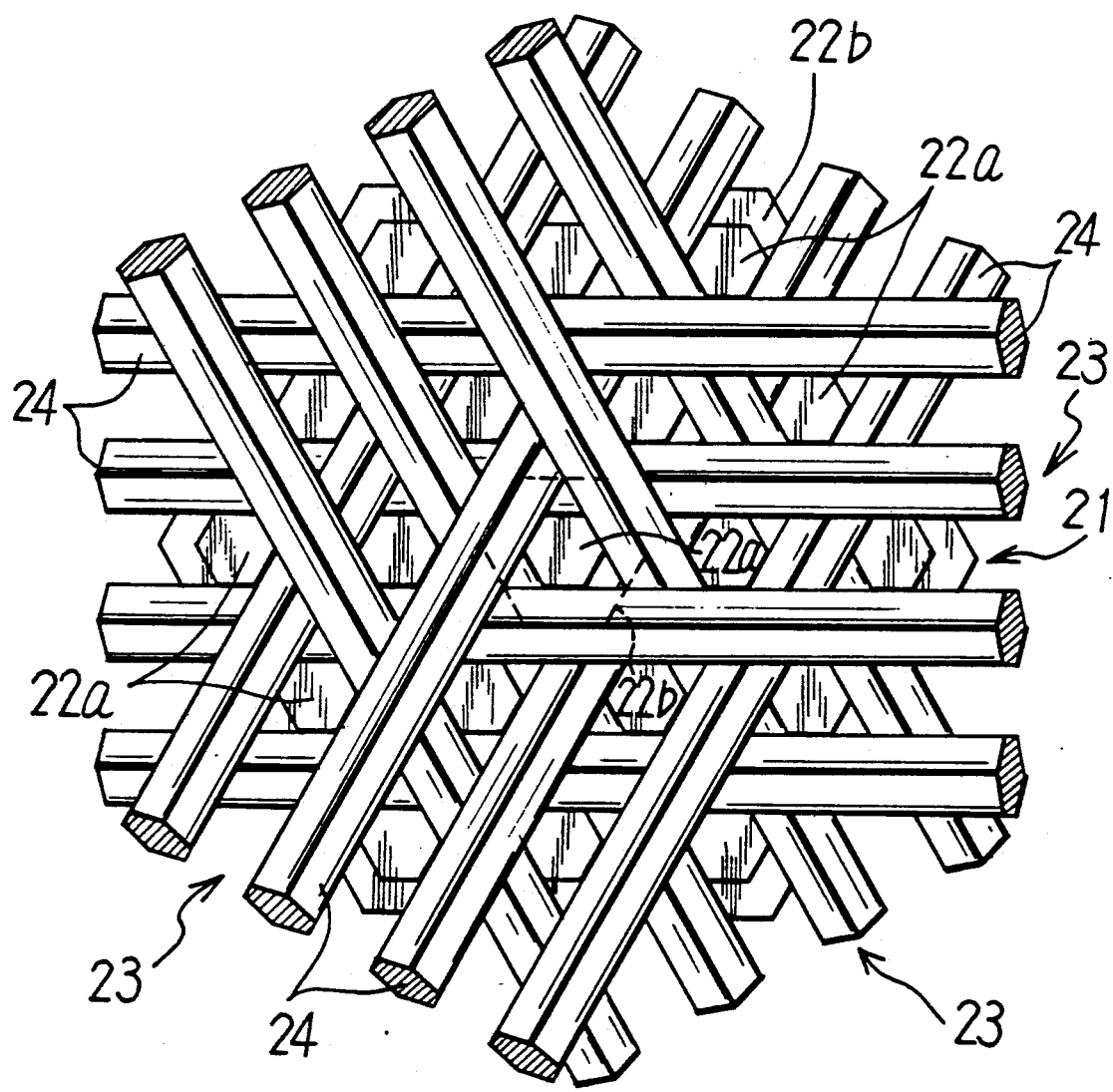
FIG. 4 is a plan view showing how groups of warp and woof rods are interwoven in a second preferred embodiment of this invention.
Figure 5:
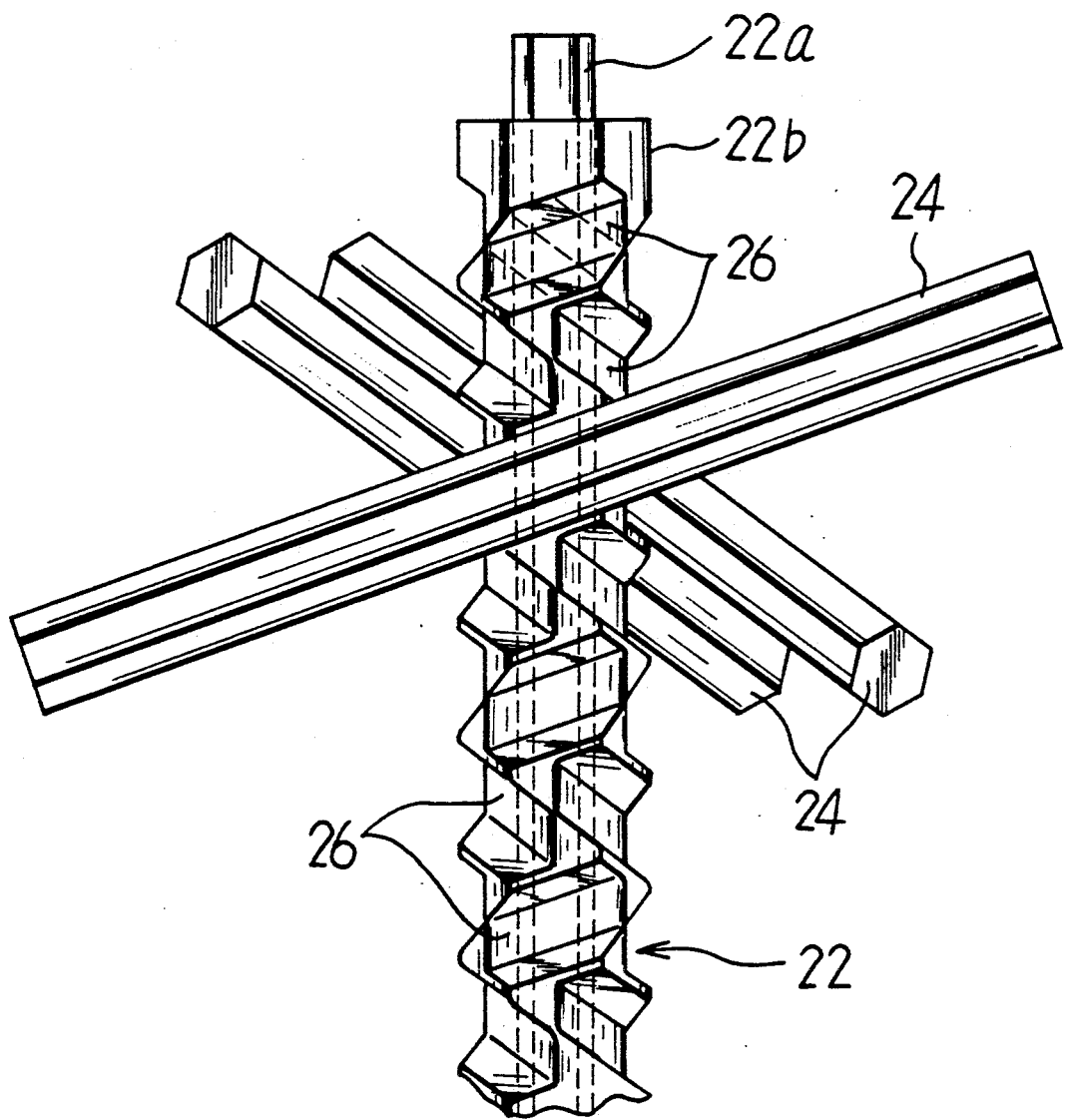
FIG. 5 is a side elevation showing the relationship between the warp and weft rods in the same embodiment.

FIGS. 4 and 5 show a second preferred embodiment of the composite material according to this invention. In the three-dimensional quadri-axis fabric composite material illustrated, the four axes are spaced apart from each other at equal angular intervals. Each warp rod 22 in a group 21 consists of a core rod 22a of the same material as the rods used in the first preferred embodiment and a surrounding member 22b of the same material as the projection 16 described before. While each core rod 22a is hexagonal in cross section, the surrounding member 22b mounted therearound is also hexagonal when looked upon from the axial direction.

Each warp rod 22 has many grooves 26 (shown in FIG. 5) sized, shaped and positioned so that many parallel weft rods 24 of the groups 23 extending along the three other axes can be obliquely inserted between adjoining warp rods 22. Because each weft rod 24 has a hexagonal cross section, the shape of the grooves 26 cut in the warp rods 22 is matched thereto. Rods of the same type as the core rod 22a may be used as the weft rods 24. The group 21 of warp rods 22 may be made up of rods having a circular cross section, with the adjoining rods kept in close contact with each other. The cross section of a groove 26 cut therein may be either semi-circular or of other appropriate shape matched to the cross-sectional shape of the weft rods to be inserted therethrough.

As is obvious from the above, weft rods can be inserted between warp rods either perpendicularly or obliquely. This permits making various types of three-dimensional multi-axis fabric composite materials in which groups of rods are interwoven along many differently oriented axes.

Adjoining rods in the above-described three-dimensional multi-axis fabric composite material can be bonded together with a matrix on the rods themselves or with a matrix substance (an adhesive or other materials) added separately, either after or during weaving.

The use of rods prepared by bonding together bundles of fibers with a matrix permits inserting and holding rods extending along two or more differently oriented axes between rods disposed parallel to each other. Thus, three-dimensional fabrics of various structures can be readily made by simply inserting in rods from freely chosen directions, without providing selvages.

Figure 6:
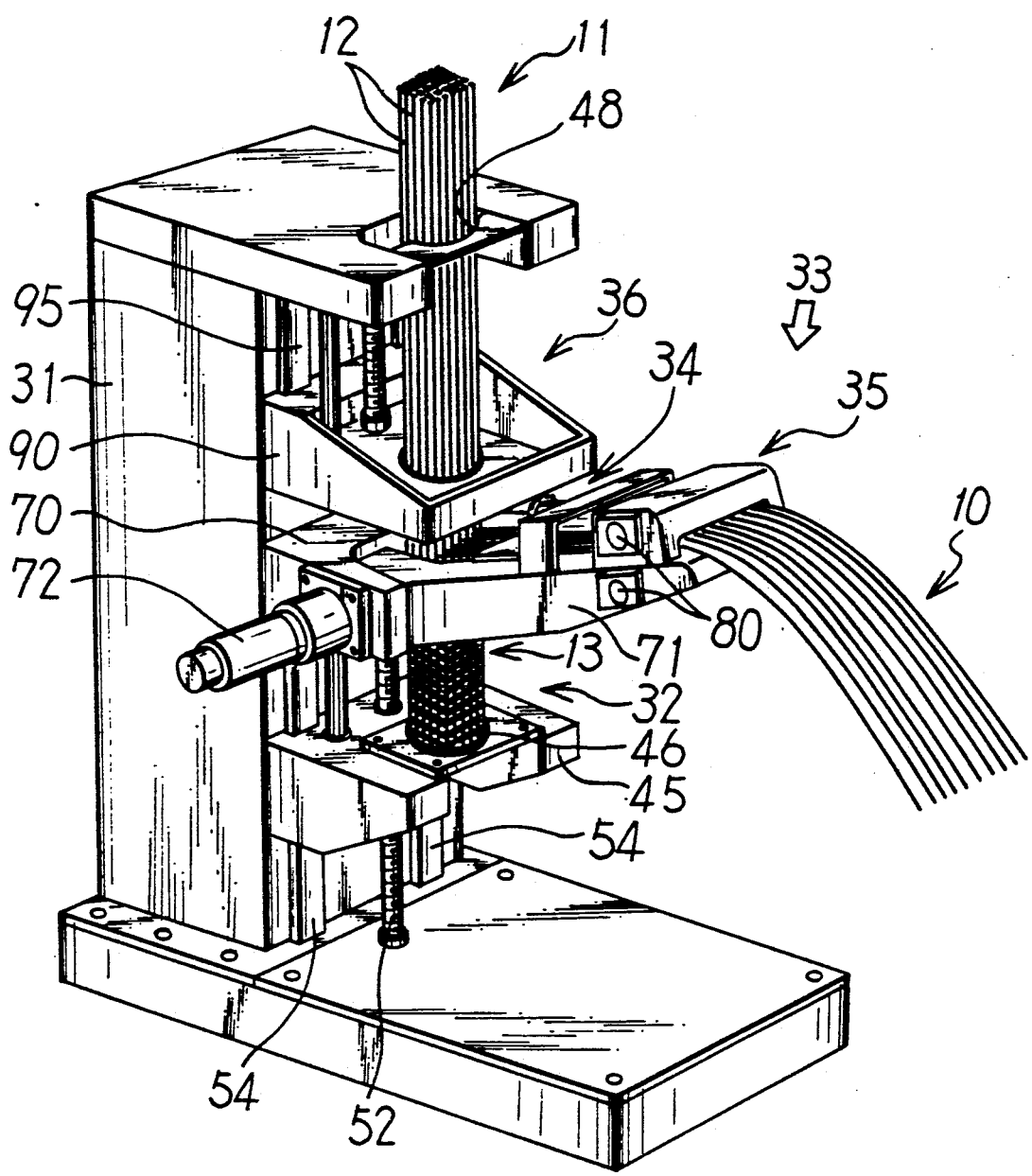
FIG. 6 is an overall perspective view showing an apparatus for making three-dimensional multi-axis fabric composite materials according to this invention.
Figure 7:
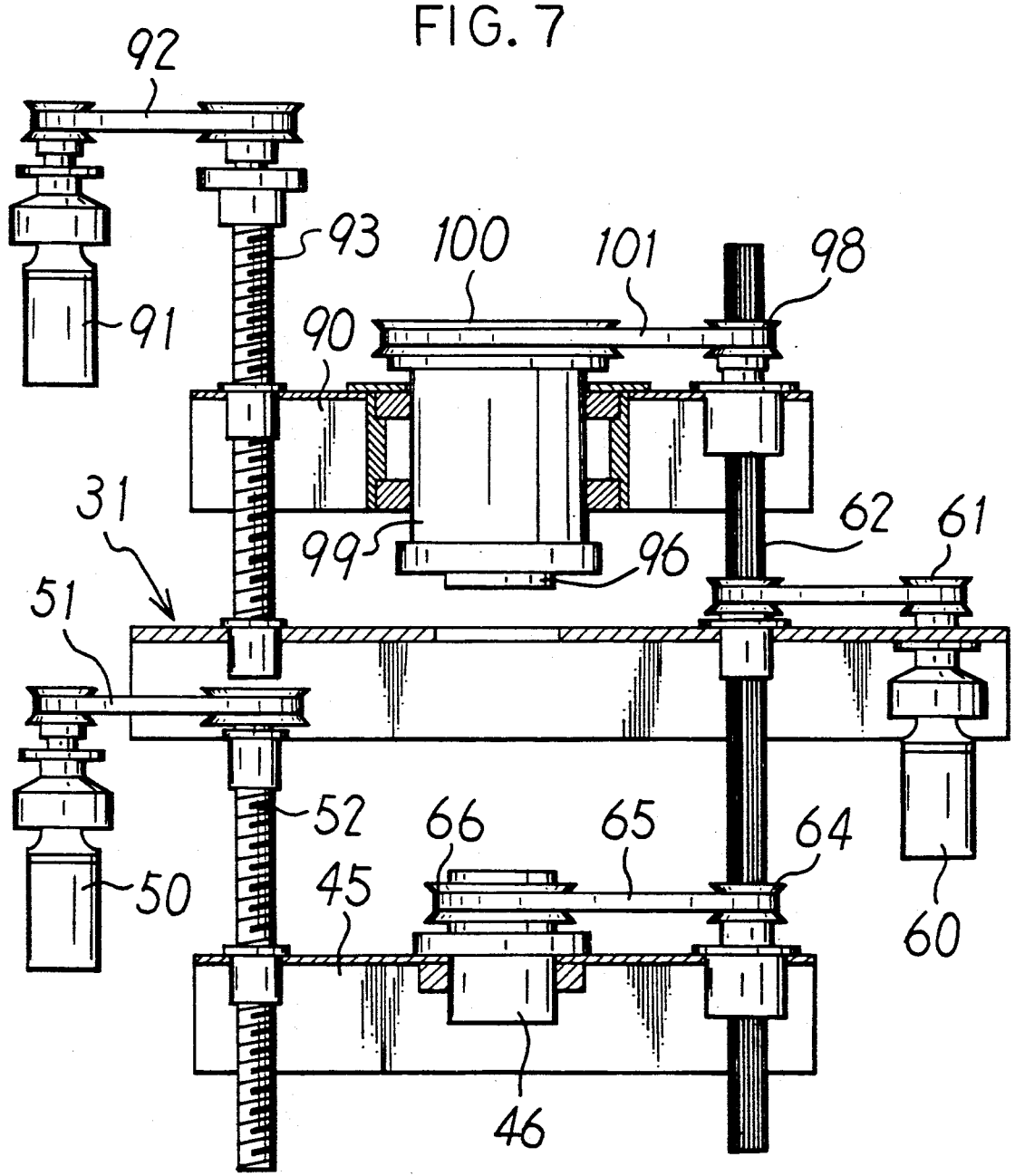
FIG. 7 is an exposed conceptual view showing the principal parts of the same apparatus.
Figure 8:
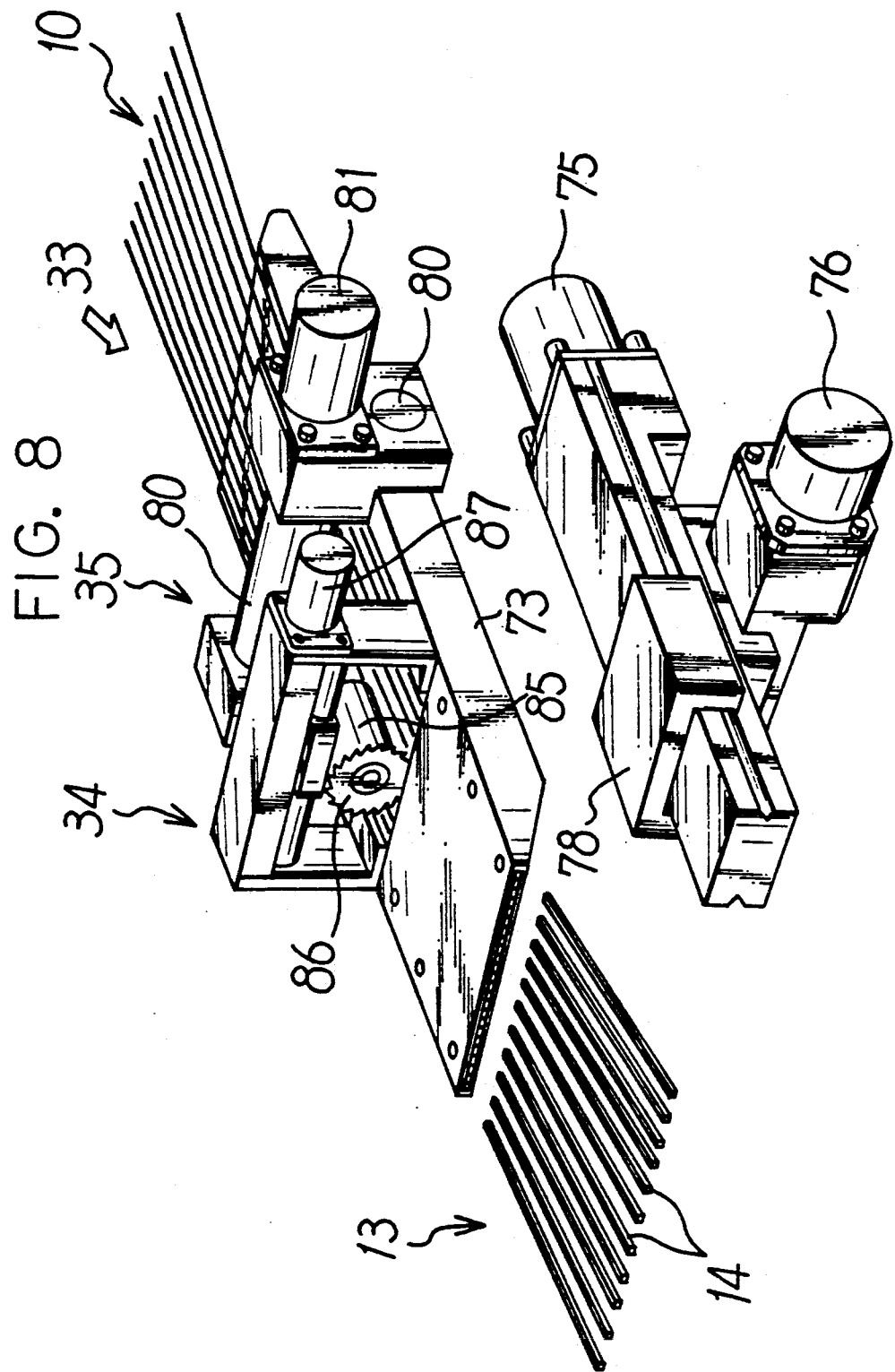
FIG. 8 is an exposed perspective view showing an example of means for inserting weft rods.

FIGS. 6 to 8 show an example of an apparatus for making three-dimensional multi-axis fabric composite materials of rods of the above-described type. The apparatus comprises a frame 31 that carries a device 32 to hold a group 11 of warp rods 12 parallel to each other at given intervals, a rod inserting mechanism 33 comprising a cutter assembly 34 to cut parallel weft rods 14 into a desired length, and a rod pushing mechanism 35 to insert the weft rods 14 between the warp rods 12 of the group 11, a mechanism to move the device 32 and the rod inserting mechanism 33 up and down as weaving proceeds in order to place the rod inserting mechanism 33 at the weaving point of the group 11 of warp rods 12, and a reed beating mechanism 36.

The device 32 to hold the group 11 of warp rods 12 comprises a longitudinally slidable support table 45 attached to the frame 31, with a rod holding disk 46 rotatably mounted on the support table 45 holding the group 11 of warp rods 12 in position. The group 11 of warp rods 12 is placed on the rod holding disk 46 by means of, for example, small holes spaced apart at given intervals (like the small holes 147 in FIG. 11) into which the tips of the warp rods 12 are pressed or a proper chuck to hold a large number of appropriately arranged warp rods 12. The upper ends of the warp rods 12 are allowed to project above guide holes 48 in the top end of the frame 31.

The support table 45 is moved so as to be lowered with the progress of weaving. As is schematically illustrated in FIG. 7, the support table 45 is moved up and down by means of a feed screw 52 that is fit in part of the support table 45 and turned by a motor 50 in the frame 31 through a belt 51. A guide 54 to guide the warp motion of the support table 45 is also provided on the frame 31.

To turn the rod holding disk 46 on the support table 45, a splined shaft 62 extending in the direction in which the support table 45 travels and turned by a motor 60 through a belt 61 is provided on the frame 31. A pulley 64, which is adapted to receive the revolution transmitted from the splined shaft 62 but allowed to slide freely in the axial direction, is provided above the support table 45. The revolution of the pulley 64 is transmitted through a belt 65 to another pulley 66 mounted on the rod holding disk 46.

The rod inserting mechanism 33 on the frame 31 comprises the previously mentioned cutter assembly 34 to cut a large number of long parallel rods 10 into a desired length and the previously mentioned rod pushing mechanism 35 to push the group 13 of cut weft rods 14 between the group 11 of warp rods 12 placed on the rod holding disk 46.

To be more specific, a table 70 mounted on the frame 31 to support the rod inserting mechanism 33 carries a tilting table 71 that is tiltable about an axis that intersects the axis along which the group of warp rods 12 of the group 11 are oriented at right angles thereto near the center of the group 11 of warp rods 12. A motor 72 mounted on the frame 31 controls the tilt angle of the tilting table 71.

The tilting table 71 carries thereon a mechanism to feed a large number of long parallel rods 10 and a rod guide 73 equipped with the cutter assembly 34 to cut the long rods 10 into a desired length. As is obvious from FIGS. 6 and 8, the rod guide 73 is attached to a drive table 78 that is mounted on the tilting table 71 in such a manner as to be moved in the direction in which the weft rods 14 of the group 13 are inserted and in the direction perpendicular thereto by motors 75, 76. The function of the motors 75, 76 is to establish the positional relationship between the group 11 of warp rods 12 placed on the rod holding disk 46 and the rod guide 73.

Turned by a motor 81, a pair of feed rollers 80, 80 on the rod guide 73 feed a large number of long rods 10 arranged parallel to each other. The cutter assembly 34 cuts the rods 10 fed to a preset position into a desired length. The cutter assembly 34 comprises a cutter 86 turned by a motor 85. A motor 87 moves the cutter 86 in the direction perpendicular to the direction in which the rods 10 are fed, whereby the rods 10 disposed parallel to each other are cut to the desired length at a stroke.

The weft rods 14 of the group 13 cut to the desired length by the cutter assembly 34 are inserted forward into between the warp rods 12 of the group 11 by the succeeding rods 10 as the motor 81 turns the paired feed rollers 80. As such, the paired feed rollers 80 driven by the motor 81 constitute the rod pushing mechanism 35 mentioned previously.

As is obvious from FIG. 6 and 7, the frame 31 carries the reed beating mechanism 36. The reed beating mechanism 36 has a reed beating table 90 that is raised and lowered to perform reed beating. The reed beating table 90 is moved up and down as a motor 91 within the frame 31 turns a feed screw 93 fit in part of the reed beating table 90 through a belt 92. The frame 31 also carries a guide 95 to guide the up-down travel of the reed beating table 90. A reed 96 is a plate having a large number of holes to pass the warp rods 12 of the group 11.

To turn the reed 96 mounted on the reed beating table 90 simultaneously with the rod holding disk 46 on the support table 45, a pulley 98 is provided above the reed beating table 90. The pulley 98 is fitted on the splined shaft 62 that is rotatably attached to the frame 31 and turned by the motor 60 through the belt 61. Though the revolution of the splined shaft 62 is transmitted to the pulley 98, the pulley 98 is allowed to slide freely in the axial direction. The revolution of the pulley 98 is transmitted through a belt 101 to a pulley 100 on a reed support 99 that is rotatably mounted on the reed beating table 90.

When carrying out weaving with the apparatus just described, a large number of warp rods 12 prepared by bonding together bundles of fibers and set parallel to each other are placed on the rod holding disk 46. Then, the paired feed rollers 80 driven by the motor 81 push the parallel weft rods 14 of the group 13, which are cut to the desired length by the cutter assembly 34, between the warp rods 12 of the group 11. The motor 60 turns the rod holding disk 46 through a desired angle through the belt 61, the splined shaft 62, and the pulleys 64, 66. By repeatedly inserting the weft rods 14 of the group 13 between the warp rods 12, a three-dimensional multi-axis fabric composite material having groups of rods along at least three different axes is made.

During operation, the support table 45 is lowered as weaving proceeds so that the point at which the weft rods 14 of the group 13 are inserted between the warp rods of the group 11 corresponds to the position of the rod pushing mechanism 35 mounted on the table 70. The reed beating mechanism 36 is actuated to perform reed beating as required when the weft rods 14 of the group 13 have been inserted.

A control unit, not shown, is provided to control the timing and amount of rotation of the individual motors as required.

The three-dimensional multi-axis fabric is made into a three-dimensional multi-axis fabric composite material by bonding together the individual rods therein with a matrix of the rods or with a separately added matrix or other adhesive, either after or during weaving.

The weft rods 14 of the group 13, which are inserted between the warp rods 12 of the group 11 from two or more directions, may be inserted either at right angles to the warp rods 12 of the group 11 by keeping the tilting table 71 on the table 70 in the horizontal position or at a given angle by tilting the tilting table 71 through a desired angle by actuating the motor 72. This permits making many different types of three-dimensional multi-axis fabrics containing variously oriented groups of rods. Three-dimensional multi-axis fabrics can also be made only by the weft rods 14 of the group 13 fed from two or more different directions, without using the warp rods 12 of the group 11 placed on the rod holding disk 46.

A three-dimensional multi-axis fabric shaped like a hollow cylinder can be made by inserting the weft rods 14 of the group 13 of appropriately adjusted lengths between warp rods 12 of the group 11 placed in ring form at given intervals along the periphery of the rod holding disk 46. The weft rods 14 of the group 13 can be cut to the desired length by temporarily limiting the length of the rods 10 projecting beyond the cutting point of the cutter 86 by means of a retractable stopper pin or other similar device in the path line of the rods.

The rod inserting mechanism 33 of the preferred embodiment just described consists of only one rod pushing mechanism 35. However, two or more rod pushing mechanisms 35 may be provided on two or more axes intersecting the warp rods 12 of the group 11, whereby the weft rods 14 of the group 13 can be inserted between warp rods 12 of the group 11 from different directions, either simultaneously or one after another.

In the above-described preferred embodiment, the weft rods 14 of the group 13 are inserted from a given direction between the warp rods 12 of the group 11 that are turned by the revolving rod holding disk 46. However, it is also possible to insert the group 13 of weft rods 14 from two or more different directions by turning the rod pushing mechanism 35 about the group 11 of warp rods 12 held in fixed position, thereby keeping the two groups of rods in an appropriate positional relationship.

Instead of lowering the support table 45 with the progress of weaving, the support table 45 may be fastened to the frame 31, and the table 70 supporting the rod inserting mechanism 33 having the rod pushing mechanism 35 to push the group 13 of weft rods 14 may be raised with the progress of weaving.

Because each rod is made of a bundle of fibers bonded together with a matrix as described before, the grouped parallel rods can be readily inserted between the rods disposed along two or more differently oriented axes. Thus, a three-dimensional fabric can be easily made by simply pushing in such rods. Such three-dimensional fabrics can be readily made by use of a simple apparatus equipped with a mechanism to push in a large number of rods disposed parallel to each other between rods disposed along two or more differently oriented axes. By varying the inserting direction of the rods or providing two or more such mechanisms, three-dimensional fabrics of various structures, in which groups of rods are disposed along three or more differently oriented axes, can be obtained. The use of rods made of matrix-bonded bundles of fibers eliminates the need of providing selvages along the edges of the fabric and, therefore, providing a mechanism to make such selvages. This in turn, simplifies the structure of the weaving machine.

When the matrix to bond a three-dimensional fabric to make a composite material is hardened by heating or cooling, it has conventionally been very difficult to equalizing the temperature in the peripheral and central areas of the composite material. Resultant nonuniform temperature distribution across the material causes a shrinkage or thermal strain that, in turn, produces many cracks in the hardened matrix.

However, this problem can be now solved by making the reed 96 of such ceramics as will generate heat when electricity is passed therethrough or by attaching a heating element to an ordinary reed. These types of reeds heat the woven rods one after another every time reed beating is carried out. The matrix of the rods, the separately added matrix, or other adhesive thus heated bonds together the groups of rods, thus forming the desired three-dimensional multi-axis fabric composite material.

Successive heating of the matrix between the groups of rods with such a reed prevents the production of cracks of the type that are produced under the influence of the thermal strain that is built up when the matrix is filled and hardened on completion of weaving, with resultant production of strong and homogeneous composite materials.

Successive heating of the groups of rods can be achieved by providing a proper device, such as an infrared heater, to successively heat the rods passed between the warp rods 12 of the group 11 on the frame 31, instead of attaching the rod heating means to the reed 96. When the reed 96 equipped with the heating element is used, the weft rods 14 of the group 13 must be inserted between the warp rods 12 of the group 11 along two or more axes perpendicular thereto because of the limit imposed by read beating. Use of the infrared heater or other similar device eliminates the need of reed beating, permitting the rod guide 73 carrying the rod inserting mechanism 33 and the cutter assembly 34 to be tilted with respect to the table 70 and the weft rods 14 of the group 13 inserted through the warp rods 12 of the group 11 at desired oblique angles.

Figure 9:
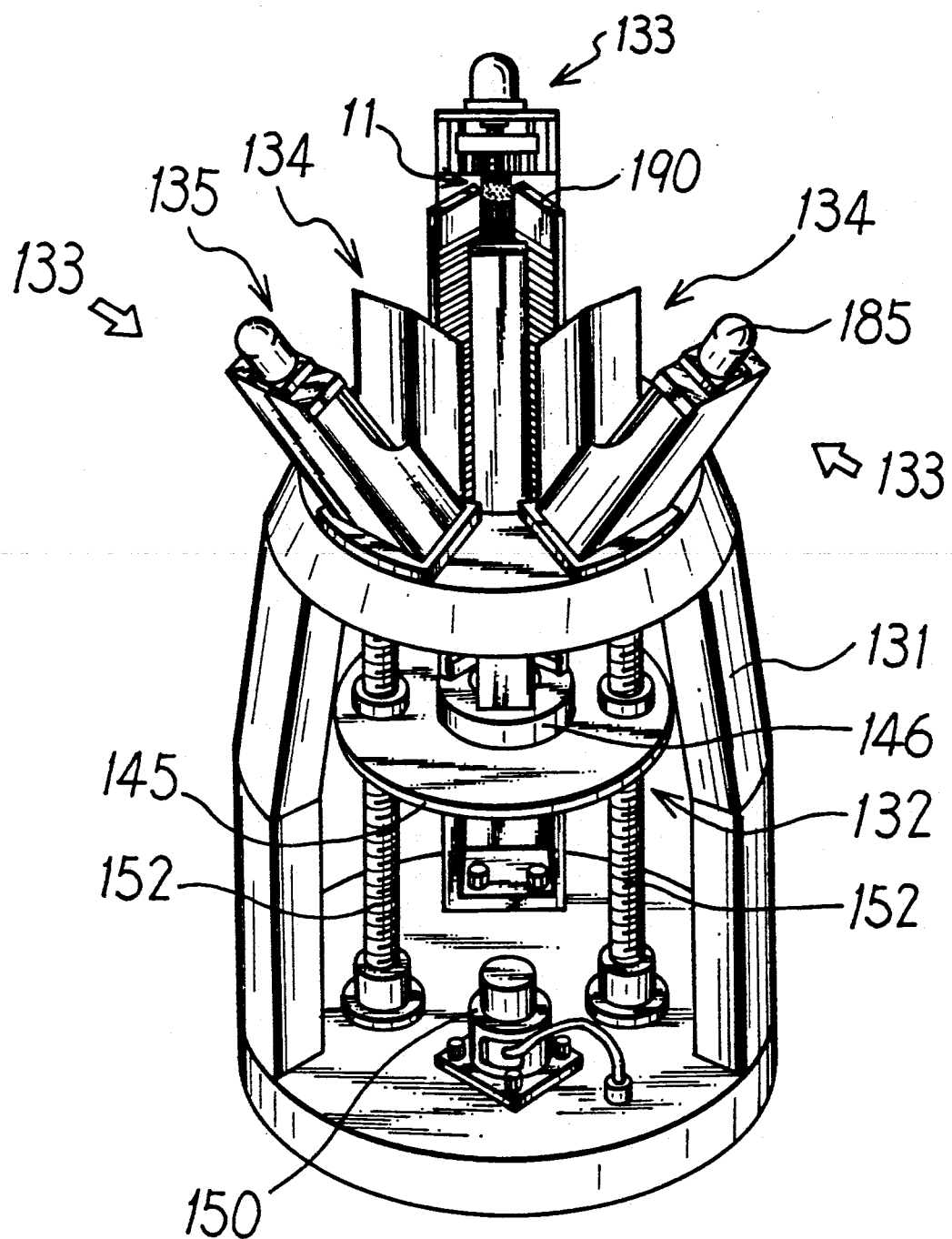
FIG. 9 is a perspective view showing another preferred embodiment of the apparatus according to this invention.
Figure 10:
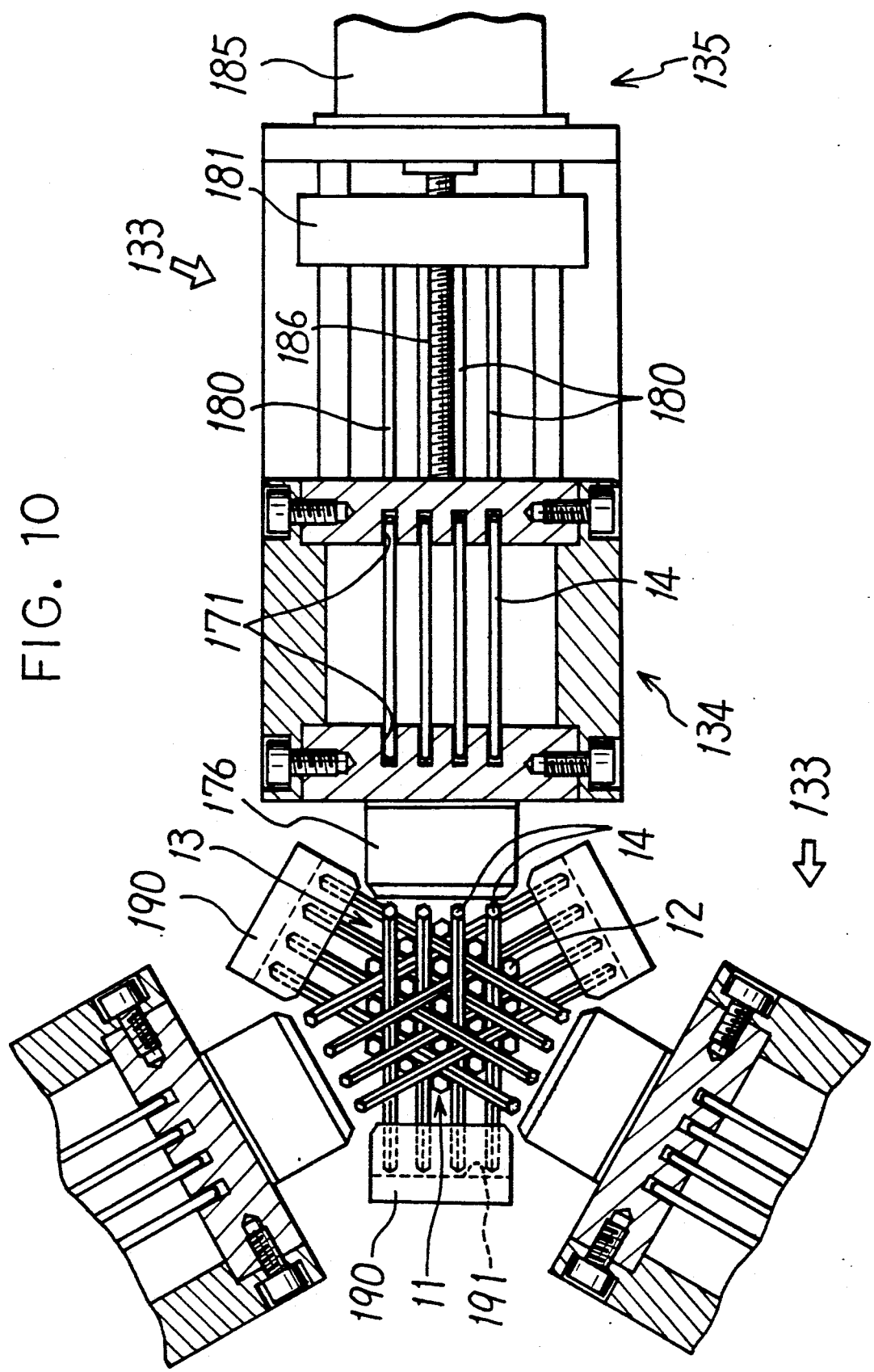
FIG. 10 is a partial plan view showing the principal parts of means for inserting weft rods of the same apparatus.
Figure 11:
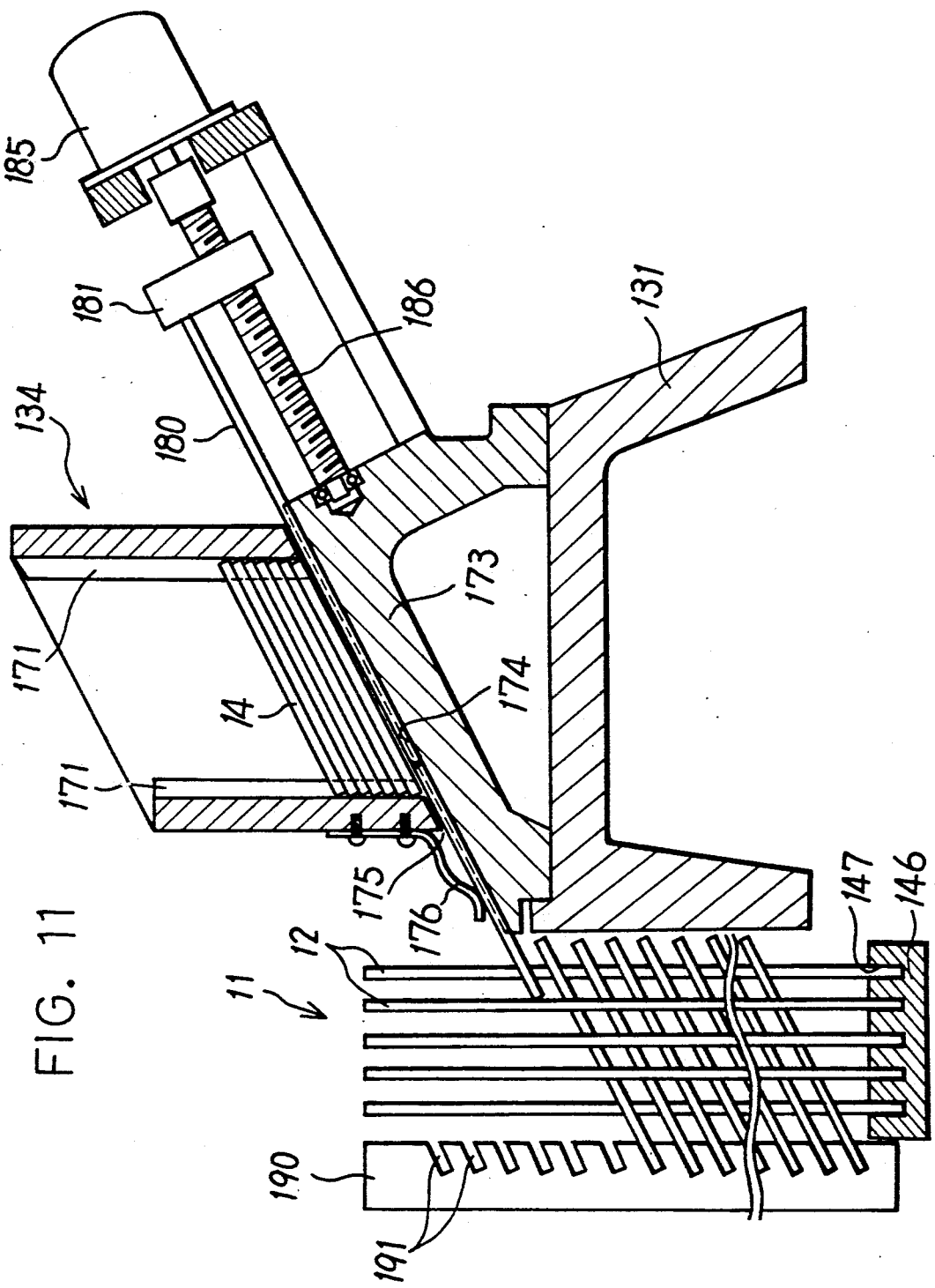
FIG. 11 is a cross-sectional side elevation of the same rod-inserting means.

FIGS. 9 to 11 show a second preferred embodiment of the apparatus according to this invention.

The principal difference between this embodiment and the one shown in FIGS. 6 to 8 is as follows: In the previous embodiment, the group 11 of warp rods 12 is turned while one rod inserting mechanism 33 is fastened to the frame 31. In the second embodiment, by contrast, the group 11 of warp rods 12 is held stationary with respect to a frame 131, and two or more rod inserting mechanisms 133 are fastened therearound. Each rod inserting mechanism 133 has a magazine sized, shaped and positioned to contain cut-length rods that are inserted, one after another, between the warp rods.

To be more specific, a device 132 to hold the group 11 of warp rods 12 comprises a support table 145 that is attached to the frame 131 in such a manner as to be moved up and down by means of a feed screw 152 that is turned by a motor 150. A rod holding disk 146 mounted on the support table 145 has the previously mentioned small holes 147 perforated at given intervals. The small holes 147 hold the warp rods 12 of the group 11 inserted therein in a fixed position.

Each of the rod inserting mechanisms 133 installed on the frame 131 around the group 11 of warp rods 12 comprises a magazine 134 to contain properly arranged cut-length weft rods 14 and a rod pushing mechanism 135 to successively push the weft rods 14 of the group 13 from within the magazine 134 between the warp rods 12 of the group 11.

The magazine 134 mounted on a rod guide table 173 attached to the frame 131 is adapted to contain a large number of cut-length rods arranged in multiple rows. On the inner walls of the magazine 134 are provided many vertical grooves 171 to guide both ends of the weft rods 14, thereby keeping the weft rods 14 in orderly position. To permit the weft rods 14 to be inserted from within the magazine 134 between the warp rods 12 of the group 11, guide grooves 174 to lead the supplied rods in the desired direction are provided on the surface of the rod guide table 173 beside one side of the magazine 134 from which the rods are taken out. An opening 175 through which the weft rods 14 are sent out is provided between the rod guide table 173 and the magazine 134. Reference numeral 176 designates a spring to hold the pushed out weft rods 14 in a stable position.

The rod pushing mechanism 135 has push bars 180 in such number as is matched to the number of weft rods 14 to be simultaneously pushed out of the magazine 134. The push bars 180 are slidably fit in the guide grooves 174 on the rod guide table 173. One end of each push bar 180 is connected to a drive member 181 that is reciprocated by a threaded rod 186 operated by a motor 185.

A holding plate 190 is disposed behind the group 11 of warp rods 12 to keep the weft rods 14 of the group 13 inserted between the warp rods 12 of the group 11 in a stable position. The holding plate 190 has many grooves 191 to hold the tips of the weft rods 14 of the group 13 inserted therein.

The structure of the three-dimensional fabric made by this second preferred embodiment is substantially equal to that with the rod orientations shown in FIGS. 4 and 5. Other parts and members of the second preferred embodiment are also substantially equal to those of the first preferred embodiment described previously, and, therefore, no detailed description is given thereof.

What is claimed is:

1. An apparatus for making a three-dimensional multi-axis fabric composite material, said apparatus comprising:
   (a) a frame;
   (b) means for holding a group of warp rods parallel to each other on said frame, each warp rod consisting of a bundle of equally oriented fibers bonded together with a matrix;
   (c) rod inserting means disposed around the group of warp rods on said frame, said rod inserting means having rod inserting mechanisms to insert multiple parallel weft rods between the warp rods from two or more differently oriented directions; and
   (d) means for moving means for holding a group of warp rods and said rod inserting means relative to each other with the progress of weaving so that said rod inserting means is positioned at a point where weaving is carried out.

2. An apparatus for making a three-dimensional multi-axis fabric composite material according to claim 1, in which said rod inserting means is tiltable with respect to the direction in which the group of warp rods are oriented.

3. An apparatus for making a three-dimensional multi-axis fabric composite material according to claim 1, in which said rod inserting means comprises:
   (a) a cutter assembly for cutting multiple parallel weft rods into a desired length and
   (b) a rod pushing mechanism comprising a pair of feed rollers for inserting the cut-length weft rods between the warp rods.

4. An apparatus for making a three-dimensional multi-axis fabric composite material according to claim 1, in which said rod inserting means comprises:
   (a) a magazine for holding multiple cut-length weft rods in multiple rows and
   (b) pushing bars that are reciprocated to push the weft rods from said magazine between the warp rods.

5. An apparatus for making a three-dimensional multi-axis fabric composite material according to claim 4, in which guide grooves for leading the weft rods supplied from said magazine in the desired direction are provided in one side thereof from which the rods held in multiple rows are taken out.

6. An apparatus for making a three-dimensional multi-axis fabric composite material according to claim 1, in which a longitudinally slidable support table serving as said means for holding a group of warp rods is mounted on said frame, with a group of warp rods being stationarily held on a rod holding disk rotatably mounted on said support table and one rod inserting means fastened to said frame.

7. An apparatus for making a three-dimensional multi-axis fabric composite material according to claim 1, in which a longitudinally slidable support table serving as said means for holding a group of warp rods is mounted on said frame, with a group of warp rods being stationarily held on a rod holding disk rotatably mounted on said support table and two or more rod inserting means fastened to said frame in such a manner as to surround the group of warp rods.

8. An apparatus for making a three-dimensional multi-axis fabric composite material according to claim 3, in which said rod inserting mechanism comprises a pair of motor-powered feed rollers that push a group of weft rods cut to the desired length by said cutter assembly between the warp rods by the forward movement of the succeeding weft rods.

9. An apparatus for making a three-dimensional multi-axis fabric composite material according to claim 1, in which a reed beating mechanism is mounted on said frame, said reed beating mechanism comprising a reed supported on a longitudinally movable reed beating table.

10. An apparatus for making a three-dimensional multi-axis fabric composite material according to claim 7, in which a longitudinally slidable support table is provided on said frame as means for holding a group of warp rods, the group of warp rods being stationarily held on a rod holding disk rotatably mounted on said support table and the reed supported on said reed beating table being adapted to be turned synchronously with said rod holding disk on said support table.

11. An apparatus for making a three-dimensional multi-axis fabric composite material according to claim 1, and further comprising means for successively hardening and forming the rods inserted between a group of warp rods by said rod inserting means.

12. An apparatus for making a three-dimensional multi-axis fabric composite material according to claim 9, in which a heating element for heating the weft rods is attached to said weaving reed, said heating element serving as means for successively hardening and forming the woven rods.

13. An apparatus for making a three-dimensional multi-axis fabric composite material according to claim 12, in which said reed is made of ceramics or other material that generates heat when electricity is supplied therethrough.

14. An apparatus for making a three-dimensional multi-axis fabric composite material according to claim 12, in which a separate heating element is attached to said reed.

* * * * *